United States Patent
Kitts

(10) Patent No.: US 7,278,105 B1
(45) Date of Patent: Oct. 2, 2007

(54) VISUALIZATION AND ANALYSIS OF USER CLICKPATHS

(75) Inventor: Brendan J. Kitts, Cambridge, MA (US)

(73) Assignee: Vignette Corporation, Austin, TX (US)

( * ) Notice: Subject to any disclaimer, the term of this patent is extended or adjusted under 35 U.S.C. 154(b) by 798 days.

(21) Appl. No.: 10/202,741

(22) Filed: Jul. 25, 2002

Related U.S. Application Data

(63) Continuation-in-part of application No. 09/934,415, filed on Aug. 21, 2001.

(60) Provisional application No. 60/308,075, filed on Jul. 26, 2001, provisional application No. 60/226,798, filed on Aug. 21, 2000.

(51) Int. Cl.
  *G06F 15/173* (2006.01)
  *B03B 1/00* (2006.01)

(52) U.S. Cl. .................... 715/736; 715/772

(58) Field of Classification Search ........ 715/734–739, 715/771–773, 748–749, 805, 802, 969, 970, 715/811, 745, 513; 709/228, 217, 231, 513
See application file for complete search history.

(56) References Cited

U.S. PATENT DOCUMENTS

| | | | |
|---|---|---|---|
| 4,754,428 A | 6/1988 | Schultz et al. | 709/246 |
| 4,811,207 A | 3/1989 | Hikita et al. | 707/2 |
| 5,210,824 A | 5/1993 | Putz et al. | 707/523 |
| 5,212,787 A | 5/1993 | Baker et al. | 707/101 |
| 5,226,161 A | 7/1993 | Khoyi et al. | 709/316 |
| 5,257,369 A | 10/1993 | Skeen et al. | 709/312 |
| 5,331,673 A | 7/1994 | Elko et al. | 714/43 |
| 5,339,392 A | 8/1994 | Risberg et al. | 345/762 |
| 5,421,015 A | 5/1995 | Khoyi et al. | 709/107 |
| 5,557,717 A | 9/1996 | Wayner | |
| 5,572,643 A | 11/1996 | Judson | 709/218 |
| 5,704,017 A | 12/1997 | Heckerman et al. | 395/61 |
| 5,724,521 A | 3/1998 | Dedrick | |
| 5,727,129 A | 3/1998 | Barrett et al. | 706/10 |
| 5,732,218 A | 3/1998 | Bland et al. | 395/200 |
| 5,740,430 A | 4/1998 | Rosenberg et al. | 395/616 |
| 5,761,416 A | 6/1998 | Mandal et al. | 395/200 |

(Continued)

OTHER PUBLICATIONS

XSL Transformations (XSLT) Version 1.0, W3C Recommendation, www.w3.org/TR/1999/REC-xslt-19991116, pp. 1-87, Nov. 16, 1999.

(Continued)

*Primary Examiner*—Steven P. Sax
(74) *Attorney, Agent, or Firm*—Sprinkle IP Law Group

(57) ABSTRACT

Methods and data processing system readable media have been created to graph user clickstream data over a network or at a network site to yield meaningful and visually esthetic information. In one set of embodiments, the method can comprise (i) performing a significance test on data from a network log and generating significance results. The method can also comprise (ii) determining which of network addresses and clicktrails between network addresses meet a traffic flow criterion. The data that meet a significance criterion, traffic criterion, or both can form (iii) graphable addresses and relationships. The method can further comprise (iv) generating statistics about the graphable addresses and relationships. The method can still further comprise (v) generating a graph based on the statistics about the graphable addresses and relationships, and (vi) changing any or all of the traffic flow, significance criterion, and statistics being computed, and regenerating the graph.

56 Claims, 10 Drawing Sheets

U.S. PATENT DOCUMENTS

| | | | |
|---|---|---|---|
| 5,774,660 A | 6/1998 | Brendel et al. | 395/200 |
| 5,790,426 A | 8/1998 | Robinson | 364/554 |
| 5,790,790 A | 8/1998 | Smith et al. | 395/200 |
| 5,796,952 A | 8/1998 | Davis et al. | 709/224 |
| 5,809,491 A * | 9/1998 | Kayalioglu et al. | 706/45 |
| 5,825,769 A * | 10/1998 | O'Reilly et al. | 370/360 |
| 5,870,559 A | 2/1999 | Leshem et al. | 709/224 |
| 5,878,223 A | 3/1999 | Becker et al. | 709/223 |
| 5,884,282 A | 3/1999 | Robinson | 705/27 |
| 5,918,014 A | 6/1999 | Robinson | 395/200.49 |
| 5,958,008 A | 9/1999 | Pogrebisky et al. | 709/223 |
| 6,012,052 A | 1/2000 | Altschuler et al. | 707/2 |
| 6,041,311 A | 3/2000 | Chislenko et al. | 705/27 |
| 6,041,335 A | 3/2000 | Merritt et al. | |
| 6,049,777 A | 4/2000 | Sheena et al. | 705/10 |
| 6,067,565 A | 5/2000 | Horvitz | 709/218 |
| 6,085,226 A | 7/2000 | Horvitz | 709/203 |
| 6,092,049 A | 7/2000 | Chislenko et al. | 705/10 |
| 6,094,662 A | 7/2000 | Hawes | 707/104 |
| 6,112,186 A | 8/2000 | Bergh et al. | |
| 6,112,279 A | 8/2000 | Wang | 711/119 |
| 6,119,103 A | 9/2000 | Basch et al. | |
| 6,128,655 A | 10/2000 | Fields et al. | 709/219 |
| 6,138,141 A | 10/2000 | DeSimone et al. | 709/203 |
| 6,141,737 A | 10/2000 | Krantz et al. | 711/171 |
| 6,144,962 A | 11/2000 | Weinberg et al. | |
| 6,185,586 B1 | 2/2001 | Judson | 707/513 |
| 6,185,608 B1 | 2/2001 | Hon et al. | 709/219 |
| 6,205,472 B1 | 3/2001 | Gilmour | |
| 6,249,773 B1 | 6/2001 | Allard et al. | |
| 6,321,206 B1 | 11/2001 | Honarvar | |
| 6,430,539 B1 | 8/2002 | Lazarus et al. | |
| 6,456,305 B1 | 9/2002 | Qureshi et al. | |
| 6,502,131 B1 * | 12/2002 | Vaid et al. | 709/224 |
| 6,509,898 B2 | 1/2003 | Chi et al. | |
| 6,526,044 B1 * | 2/2003 | Cookmeyer et al. | 370/352 |
| 6,553,568 B1 * | 4/2003 | Fijolek et al. | 725/111 |
| 6,559,882 B1 | 5/2003 | Kerchner | |
| 6,606,654 B1 | 8/2003 | Borman et al. | |
| 6,606,657 B1 | 8/2003 | Zilberstein et al. | |
| 6,629,136 B1 | 9/2003 | Naidoo | |
| 6,633,544 B1 * | 10/2003 | Rexford et al. | 370/238 |
| 6,640,215 B1 | 10/2003 | Galperin et al. | |
| 6,654,725 B1 | 11/2003 | Langheinrich et al. | |
| 6,665,658 B1 | 12/2003 | DaCosta et al. | |
| 6,671,254 B1 * | 12/2003 | Nakahira | 370/229 |
| 6,732,331 B1 | 5/2004 | Alexander | |
| 6,757,740 B1 | 6/2004 | Parekh et al. | |
| 6,781,982 B1 * | 8/2004 | Borella et al. | 370/352 |
| 6,839,682 B1 | 1/2005 | Blume et al. | |
| 6,904,408 B1 | 6/2005 | McCarthy et al. | |
| 6,996,536 B1 | 2/2006 | Cofino et al. | |
| 2001/0037321 A1 | 11/2001 | Fishman et al. | |
| 2002/0070953 A1 * | 6/2002 | Barg et al. | 345/700 |
| 2002/0087679 A1 * | 7/2002 | Pulley et al. | 709/224 |
| 2002/0173971 A1 * | 11/2002 | Stirpe et al. | 705/1 |
| 2003/0018584 A1 * | 1/2003 | Cohen et al. | 705/52 |
| 2003/0018626 A1 * | 1/2003 | Kay et al. | 707/3 |
| 2003/0023715 A1 * | 1/2003 | Reiner et al. | 709/224 |
| 2003/0115333 A1 * | 6/2003 | Cohen et al. | 709/227 |

OTHER PUBLICATIONS

Kitts, "An Evaluation of Customer Retention and Revenue Forecasting in the Retail Sector: Investigation into the effects of Seasonality, Spending an Method" by DataSage, Inc., Oct. 25, 1999. 63 pages.

Kitts, "RMS Revenue and Retention Forecasting Final Phase Model Specification" by DataSage, Inc., Jan. 31, 2000, 16 pages.

Discount Store News, "Datasage Customer Analyst," 1998.

Montgomery, et al., "Estimating Price Elasticities with Theory-Based Priors," J. Marketing Research, vol. 36, pp. 413-423, 1999.

Simon, "Price Management," Elsevier Sci Pub, pp. 13-41, 1989.

Subrahmanyan and Shoemaker, "Developing Optimal Pricing and Inventory Policies for Retailers Who Face Uncertain Demand," J. Retailing, vol. 72, pp. 7-30, 1996.

Vilcassim and Chintagunta, "Investigating Retailer Product Category Pricing from Household Scanner Panel Data," J. Retailing, vol. 71, pp. 103-128, 1995.

Weinstein, "Tackling Technology," Progressive Grocer, 1999.

Wellman, "Down in the (Data) Mines," Supermarket Business, pp. 33-35, 1999.

RT News, "New Customer Management System Returns Lost Sales to Dick's," RT Magazine, 1999.

DataSage, Inc., "DataSage Customer Analyst," Progressive Grocer, 1998.

Miller, M., "Applications Integration-Getting It Together," PC Magazine, Feb. 8, 1994, pp. 111-112, 116-120, 136, 138.

PointCast 2.0 Eases Burden on Network, 3 pp., Jun. 2, 1997.

Strom, David, The Best of Push, 7 pp., Apr. 1997.

When Shove Comes to Push, 7 pp., Feb. 10, 1997.

thirdvoice.com—Home Page and Frequently Asked Questions (7 pages), www.thirdvoice.com, www.thirdvoice.com/help.20/faq.htm, 2000.

Cabena, Peter et al., Intelligent Miner for Data Applications Guide, IBM RedBook SG24-5252-00, Mar. 1999.

Datasage.com News and Events—DataSage Releases netCustomer, the 1st Individualization Solution for E-Commerce, retrieved Feb. 16, 2005 from Archive.org , 3 pgs, Aug. 2, 1999.

Datasage.com—Executive Overview—Retail, Retail Data Mining Executive Overview, retrieved Feb. 16, 2005 from Archive.org, 7 pgs, Dec. 1998.

Gallant, Steve et al., Successful Customer Relationship Management in Financial Applications (Tutorial PM-1), Conference on Knowledge Discovery in Data, ISBN:1-58113-305-7, pp. 165-241, 2000.

Vignette Corporation to Acquire DataSage, Inc., retrieved from Archive.org Feb. 16, 2005, 3 pgs, Jan. 10, 2000.

Chapman, Pete et al., CRISP-DM 1.0—Step-by-step data mining guide, retrieved from www.crisp-dm.org Feb. 17, 2005, pp. 1-78, 2000.

* cited by examiner

FROM FIG. 3

| SessionID | VisitorID | TIME SPENT | DATE TIME | CsUriStem | CIP | DisplayID | FUNCTION |
|---|---|---|---|---|---|---|---|
| 1175673 | 212859 | 17 | 10/1/99 0:05 | /index.html | 10.100.2.1 | — | — |
| 1175673 | 212859 | 14 | 10/1/99 0:05 | /cpi/taf/auction.taf | 10.100.2.1 | — | f=list |
| 1175673 | 212859 | 19 | 10/1/99 0:06 | /cpi/taf/auction.taf | 10.100.2.1 | 29 | f=items |
| 1175673 | 212859 | 29 | 10/1/99 0:06 | /cpi/taf/auction.taf | 10.100.2.1 | 19 | f=items |
| 1175673 | 212859 | 15 | 10/1/99 0:06 | /cpi/taf/auction.taf | 10.100.2.1 | 10 | f=items |
| 1175673 | 212859 | 14 | 10/1/99 0:07 | /cpi/taf/auction.taf | 10.100.2.1 | 20 | f=items |
| 1175673 | 212859 | 24 | 10/1/99 0:07 | /cpi/taf/displayitem.taf | 10.100.2.1 | 39409 | — |
| 1175673 | 212859 | 45 | 10/1/99 0:07 | /cpi/taf/auction.taf | 10.100.2.1 | 39409 | f=bid |
| 1175673 | 212859 | 13 | 10/1/99 0:08 | /cpi/taf/auction.taf | 10.100.2.1 | 39409 | f=submitbid |
| 1175673 | 212859 | 9 | 10/1/99 0:08 | /cpi/taf/auction.taf | 10.100.2.1 | 20 | f=items |
| 1175673 | 212859 | 25 | 10/1/99 0:08 | /cpi/taf/auction.taf | 10.100.2.1 | 39409 | f=bid |
| 1175673 | 212859 | 32 | 10/1/99 0:09 | /cpi/taf/auction.taf | 10.100.2.1 | 3 | f=items |
| 1175673 | 212859 | 20 | 10/1/99 0:09 | /cpi/taf/auction.taf | 10.100.2.1 | 14 | f=items |
| 1175673 | 212859 | 0 | 10/1/99 0:10 | /cpi/taf/auction.taf | 10.100.2.1 | 1 | f=items |

FIG. 5

| SessionID | VisitorID | TIME SPENT | DATE TIME | CsUriStem | CIP | DisplayID | FUNCTION |
|---|---|---|---|---|---|---|---|
| 1175678 | | 79 | 10/1/99 0:06 | /cpi/html/powertools/index.html | 10.100.2.1 | — | — |
| 1175678 | | 26 | 10/1/99 0:07 | /index.html | 10.100.2.1 | — | — |
| 1175678 | | 52 | 10/1/99 0:07 | /cpi/html/grabbag/index.html | 10.100.2.1 | — | — |
| 1175678 | | 201 | 10/1/99 0:08 | /cpi/taf/catreq.taf | 10.100.2.1 | — | f=catform |
| 1175678 | | 0 | 10/1/99 0:12 | /cpi/taf/catreq.taf | 10.100.2.1 | — | ActionArg=2 |

FIG. 6 ced from the data was originally performed using retail
VISUALIZATION AND ANALYSIS OF USER CLICKPATHS

RELATED APPLICATIONS

This application claims priority under 35 U.S.C. § 119(e) to U.S. Provisional Patent Application Nos. 60/308,075, entitled "Visualization and Analysis of User Clickpaths" by Kitts filed Jul. 26, 2001, and 60/226,798, entitled "Method and System for Graphically Representing Customer Affinities" by Kitts, filed Aug. 21, 2000, and claims priority under 35 U.S.C. § 120 to U.S. patent application Ser. No. 09/934,415, entitled "A System and Method For Graphically Analyzing Product Interactions" by Kitts, filed Aug. 21, 2001, which claims priority from U.S. Provisional Patent Application No. 60/226,798, entitled "Method and System for Graphically Representing Customer Affinities" by Kitts, filed Aug. 21, 2000. This application is also related to U.S. patent application Ser. No. 10/202,742, entitled "Network Real Estate Analysis" by Kitts, filed July 25, 2002. All applications listed in this paragraph are assigned to the current assignee hereof and are incorporated herein by reference.

FIELD OF THE INVENTION

This invention relates in general to methods and data processing system readable storage media, and more particularly, to methods of visualizing and analyzing traffic over networks and at network sites and data processing system readable media having software code for carrying out those methods.

DESCRIPTION OF THE RELATED ART

The World Wide Web has only been in existence since 1992; however, in that time, it has had a tremendous impact in diverse areas such as news, shopping, and recreation. Yet, despite the proliferation of web sites, analysis of user navigation on the web has remained rudimentary. This is in stark contrast with the off-line world where elaborate studies have been conducted into shopper browsing behavior.

The mystery as to "where customers are going" and "what causes a purchase" is especially problematic for commercial sites, which face a desperate battle to improve browser-to-buyer conversion rates, increase revenue from transactions, and deliver meaningful content before the user departs. Therefore, making sense of user clickstreams has become a key problem area for data mining. Clickstream analysis or what some have termed "Web usage mining" presents a series of difficulties ranging from the manipulation of unprecedented amounts of data (hundreds of times the volume of off-line sources), to analysis techniques, and finally visualization.

Some results have been reported, but the work does not provide a complete solution to the problem. The mining of associations from data was originally performed using retail Point of Sales ("POS") data. Association mining was subsequently applied to web pages. Web log miners have been developed, and a few previous attempts to automatically graph web site usage have been described. Graphs produced by at least one web log miner display selected data using only a support criterion to filter the data.

Although the idea of using graphing to represent clicktrails has been recognized in previous work, it has not been attempted on a large scale, it has not utilized significance testing to determine which addresses and relationships should be visible on the graph, nor has it combined this with graph layout optimization. Graphing clicktrails from large sites presents a range of challenges that the prior art has not addressed.

SUMMARY OF THE INVENTION

Methods and data processing system readable media have been created to graph user clickstream data over a network or at a network site to yield meaningful and visually esthetic information. In one set of embodiments, the method can comprise (i) performing a significance test on the network addresses and relationships between network addresses from a network log and generating significance results. The method can also comprise (ii) determining which of network addresses and clicktrails between network addresses meet a traffic flow criterion. The data that meet a significance criterion, traffic criterion, or both can form (iii) graphable addresses and relationships. The method can further comprise (iv) generating statistics about the graphable addresses and relationships. The method can still further comprise (v) generating a graph based on the statistics about the graphable addresses and relationships, or (vi) changing any or all of the traffic flow, significance criterion, and statistics being computed, and regenerating the graph.

In other embodiments, a data processing system readable medium can have code embodied within it. The code can include instructions that are configured to cause a data processing system for performing the methods described herein.

The foregoing general description and the following detailed description are exemplary and explanatory only and are not restrictive of the invention, as defined in the appended claims.

BRIEF DESCRIPTION OF THE DRAWINGS

The present invention is illustrated by way of example and not limitation in the accompanying figures, in which:

FIGS. 5 and 6 include data that can be collected in a network site log.

Figure 1:
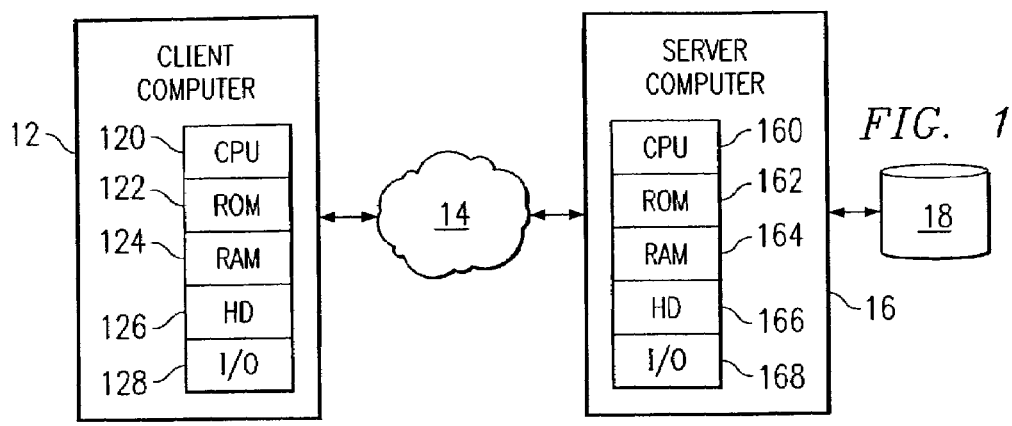
FIG. 1 includes an illustration of a client computer and a server computer as part of a computer network.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

Methods and data processing system readable media have been created to graph user clickstream data from a network or network site to yield meaningful and visually esthetic information. In one set of embodiments, the method can comprise (i) performing a significance test on data (e.g., network addresses and potential relationships between network addresses) from a network log and generating significance results. The method can also comprise (ii) determining which of network addresses and clicktrails between network addresses meet a traffic flow criterion. The data that meet a significance criterion, a traffic flow criterion, or both can form (iii) graphable addresses and relationships. The method can further comprise (iv) generating statistics about the graphable addresses and relationships. The method can still further comprise (v) generating a graph based on the statistics about the graphable addresses and relationships, or (vi) changing any or all of the traffic flow, significance criterion, and statistics being computed, and regenerating the graph.

(i) Traffic Flow Criterion

In some embodiments, the traffic flow criterion (for including or excluding a network address) may be whether the number of distinct users who have requested that particular address in a given time-period is greater than a particular threshold. Other criteria are possible, for example, the total hits recorded against an address per unit time, the number of sessions in which the address was requested per unit time. Note that the traffic flow criterion may itself be part of the significance test used below, and therefore the traffic flow criterion as outlined herein may be omitted.

(ii) Significance Test

In some embodiments, the significance test (for including or excluding a network address) may comprise whether the probability of a user requesting the specific network addresses during a session is greater than or equal to a particular threshold. In other embodiments, the significance test (for including or excluding a pair of addresses) may comprise whether the probability of requesting the pair of network addresses during the session is greater than or equal to a particular threshold. The significance test (for including or excluding a pair of addresses) can further comprise whether the observed probability for the pair of addresses divided by the product of the request probabilities of each network address within the pair (the expected probability of the pair occurring together) is greater than or equal to a particular threshold. In other embodiments, the significance test may be a chi-square test involving the same observed and expected probabilities. In still other embodiments, the significance test may be a mutual information criterion involving the same observed and expected probabilities. Other variations may be used as well.

(iii) Graphable Network Addresses and Relationships

Network addresses may be considered graphable (visible on the graph) if they meet the significance criterion and/or the traffic flow criterion. Relationships between network addresses (such as traffic flow, conditional probabilities of clicking on a second site, given a click on the first, and so on) may be considered graphable if they meet a significance criterion and/or traffic flow criterion. If any of the criteria are changed, data that was considered graphable may no longer be considered graphable, or alternatively, data that was not previously considered graphable may now be considered graphable (iv) Statistics about Graphable Network Addresses Statistics about graphable network addresses may include nearly any statistics pertaining to the relationships between network addresses, or network addresses themselves.

The statistics computed and displayed on the graph may be different from the significance test results above. For example, a significance test on a clicktrail between address a and b might be that the chi-square likelihood of clicking on a and b in the same session is greater than some value. Thus, if a relationship between a and b is to be displayed, it exceeds this chi-square value. Alternatively, the statistic that might be shown on the graph might be the total number of customers visiting a and b together. Thus, the range of statistics that the graph may show is not limited by the significance test procedures used to decide which addresses and relationships should be visible.

(v) Generate Graph

Graph generation can involve using nodes to represent network addresses and edges to represent relationships between network addresses. The generation can further comprise positioning those nodes and edges so that the graph is easy to understand to a human analyzing the graph.

(vi) Interactively Changing Parameters and Re-Generating the Graph

Visually analyzing click behavior can be a very time-consuming task and may require fine adjustment of the significance criterion, traffic flow criterion, and statistics displayed on the graph, or any combination thereof. As a result, the user may change any or all of these parameters and regenerate the graph using the new parameters.

In other embodiments, a data processing system readable medium can have code embodied within it. The code can include instructions that are configured to cause a data processing system for performing the methods described herein.

Before discussing embodiments of the present invention, a hardware architecture for using embodiments is described. FIG. 1 illustrates an exemplary architecture and includes a client computer 12 that is bi-directionally coupled to a network 14, and a server computer 16 that is bi-directionally coupled to the network 14 and a database 18. The client computer 12 includes a central processing unit ("CPU") 120, a read-only memory ("ROM") 122, a random access memory ("RAM") 124, a hard drive ("HD") or storage memory 126, and input/output device(s) ("I/O") 128. The I/O devices 128 can include a keyboard, monitor, printer, electronic pointing device (e.g., mouse, trackball, etc.), or the like. The server computer 16 can include a CPU 160, ROM 162, RAM 164, HD 166, and I/O 168.

Each of the client computer 12 and the server computer 16 is an example of a data processing system. ROM 122 and 162, RAM 124 and 164, HD 126 and 166, and the database 18 include media that can be read by the CPU 120 or 160. Therefore, each of these types of memories includes a data processing system readable medium. These memories may be internal or external to the computers 12 and 16.

Figure 2:
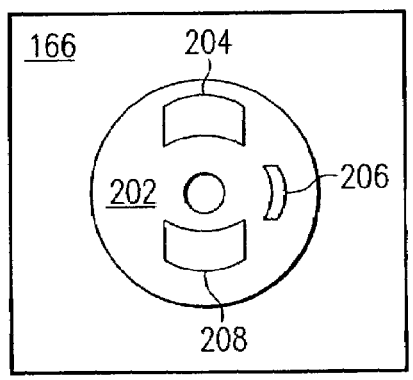
FIG. 2 includes an illustration of a data processing system storage medium including software code having instructions in accordance with an embodiment of the present invention.

The methods described herein may be implemented in suitable software code that may reside within ROM 122 or 162, RAM 124 or 164, or HD 126 or 166. In addition to those types of memories, the instructions in an embodiment of the present invention may be contained on a data storage device with a different data processing system readable storage medium, such as a floppy diskette. FIG. 2 illustrates a combination of software code elements 204, 206, and 208 that are embodied within a data processing system readable medium 202, on a HD 166. Alternatively, the instructions may be stored as software code elements on a DASD array, magnetic tape, floppy diskette, optical storage device, or other appropriate data processing system readable medium or storage device.

Figure 3:
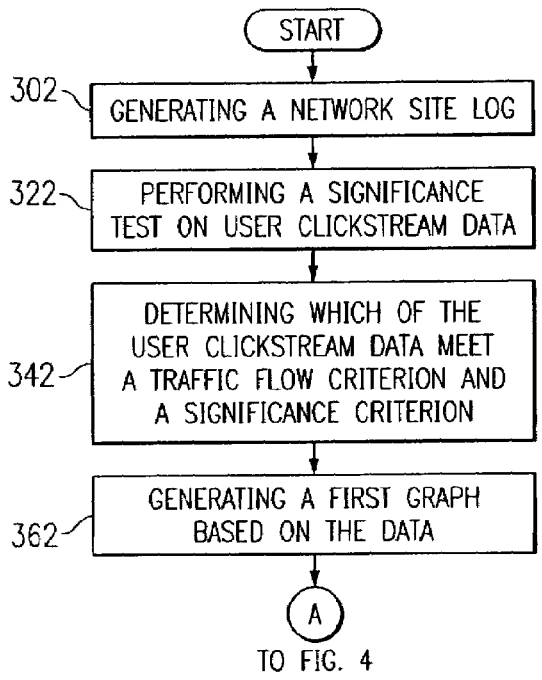
FIGS. 3 and 4 includes a process flow diagram for graphing traffic at a network site of the computer network shown in FIG. 1.
Figure 4:
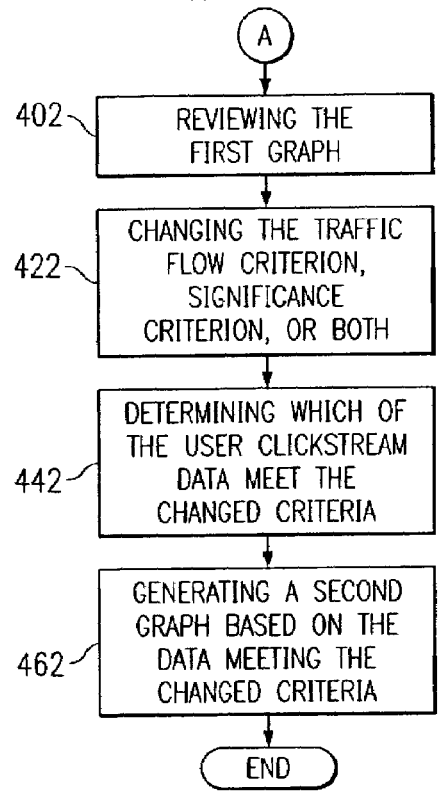

In an illustrative embodiment of the invention, the computer-executable instructions may be lines of compiled C++, Java, or other language code. Other architectures may be used. For example, the functions of the client computer 12 may be incorporated into the server computer 16, and vice versa. Further, other client computers (not shown) or other server computers (not shown) similar to client computer 12 and server computer 16, respectively, may also be connected to the network 14. FIGS. 3 and 4 include illustrations, in the form of flowcharts, of the structures and operations of such a software program.

Communications between the client computer 12 and the server computer 16 can be accomplished using electronic, optical, radio frequency, or other signals. When a user (human) is at the client computer 12, the client computer 12 may convert the signals to a human understandable form when sending a communication to the user and may convert input from a human to appropriate electronic, optical, radio frequency, or other signals to be used by the client computer 12 or the server computer 16.

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider. An Internet Service Provider ("ISP") is a common type of network access provider. A network address includes information that can be used by a server computer to locate information, whether internal to that server computer or at a different, remote computer or database. Uniform Resource Locators ("URLs") are examples of network addresses. A network site typically includes pages or other information displays at different network addresses for that network site. A web site is a common type of network site. Note that the examples given within this paragraph are for purposes of illustration and not limitation.

Attention is now directed to methods of using the network, graphing and analyzing traffic on a network in a meaningful and esthetically pleasing way. A user at the client computer 12 may send a request for information in the form of a network address over the network 14 to the server computer 16. In response to the request, the server computer 16 sends information corresponding to the network address over the network 14 to the client computer 12. During a session, activity of the user at client computer 12 may be stored within a network site log that may reside within database 18. Other users, similar to the user, are at other client computers (not shown), similar to client computer 12, to access the information via the network 14 and server computer 16. The network site log may include millions or potentially billions of records.

Embodiments described herein can be used to graphically present information regarding user behavior at a network site in a relatively easy to understand form. FIG. 3 includes a flow diagram for a method of graphing traffic at a network site. The method can comprise generating network site log (block 302). The method can also comprise performing a significance test on user clickstream data (block 322) and determining which of the user clickstream data meet traffic flow and significance criteria (block 342). The method can further comprise generating a first graph based on the data (block 362) and reviewing the graph (block 402). Optionally, the method can comprise changing the traffic flow criterion, significance criterion, or both (block 422) and determining which of user clickstream data meet the changed criteria (block 442). The method can further comprise generating a second graph based the data meeting the changed criteria (block 462). Attention is now directed to details of the method and software for implementing the method.

Whenever a user clicks on a piece of content while at a network address, the click is interpreted as a request for information from the user at client computer 12 and is sent to the server computer 16 over the network 14. The server computer 16 then responds by sending the content to the user at client computer 12.

When the server computer 16 receives requests, it is common for the request to be recorded in a special file known as a network site log or a web site log when using the Internet. At this point, the method can be used to generate the network site log (block 302 in FIG. 3). Logging can be an important activity because network site designers may need to be aware of any repeated errors on their site (e.g., page not found errors), how many customers are requesting content, and other feedback on the site's performance.

Network site logs may use the Extended Log Format proposed by the W3 Consortium, or log formats proposed by Microsoft or Sun Corporation. The logs may include various information relating to requests from users, such as date, time, bytes transferred, Internet Protocol (IP) address of request, status code (flagging, for instance, whether an error was generated), and URI-stem (giving the page, file or resource that was requested).

FIGS. 5 and 6 can include data for the logs of two users during different sessions. FIG. 5 may indicate that the user is participating in an auction. The user places a bid before leaving the site. FIG. 6 shows another user that is seeking information about some power tools and the "grabbag" network address. The portion of the log in FIG. 6 can show that this other user goes to the catalogue request form and fills in his or her address to be mailed a catalogue. Note that the user does not need to be identified as shown in FIG. 6. All data in FIG. 6 is for the same session (all tuples have the same session identifier). The network site log for server computer 16 may be located within tables or files in database 18.

Visitor records are logically divided into sets called "sessions." A session contains the clickstream of a visitor at a particular site. A session begins when a user at client computer 12 enters a network site served by computer 16 (begins making requests from that server) and lasts until the user at client computer 12 leaves the network site (ceases making requests). In reality, a user may remain at a site for a very long period of time. In order to conclude all sessions, after a predetermined time period of inactivity by the user at client computer 12, the server computer 16 may record that the session has concluded and write data within the database

18 (or log file) regarding the session. The predetermined time period can be chosen to be almost any time period. For example, a time period of 30 minutes, one hour, six hours, or the like may be chosen.

Statistics about Graphable Network Addresses and Relationships:

Nearly any number of statistics can be generated from the network site log. The statistics described herein are meant to be illustrative and not limit the present invention. Other statistics or derivatives from them may be used.

Traffic is a statistic that may be generated and can be approximately the number of times a specific network site address (i.e., page) has been requested. The probability that the specific network site will be requested can be approximately equal to the number of sessions in which the specific network address ("a") divided by the total number of sessions (#X).

$Pr(a) \approx \text{Traffic}(a)/\#X$

A sequential affinity S(a,b) can be the number of sessions in which an event (or thing) occurred directly after a different event (or thing). For example, the sequential affinity S(a,b) can be the number of sessions in which it was observed that a user went directly from network address a to network address b.

$$S(a, b) = \sum_{s} a, b \in X_s : \text{time}(b) = \text{time}(a) + 1$$

A temporal affinity T(a,b) can be the number of times that any user went from network address a to eventually reach network address c, after any number of clicks during the same session (<a,c>).

$$T(a, b) = \sum_{s} a, b \in X_s : \text{time}(b) > \text{time}(a)$$

A non-temporal affinity N(a,b) may be the number of times that two different network site addresses were requested during a single session, regardless of order or number of intervening clicks.

$$N(a, b) = \sum_{s} a, b \in X_s$$

A click distance statistic C(a,b) can be the number of clicks on average it takes for a customer to travel between a pair of network addresses.

$$C(a, b) = \frac{1}{T(a, b)} \sum_{s} [\min(\text{time}(b) - \text{time}(a))] : a, b \in X_s \wedge \text{time}(b) > \text{time}(a)$$

A conditional probability is the likelihood of an event given a different event (e.g., going from one network address to another network address). The non-temporal conditional probability of viewing page b, given a view of page a, may be equal to:

$Pr(b|a) \approx N(a,b)/\text{Traffic}(a),$

To show how these statistics may be used, the probability of a user making it to the ad-landing-page given exposure to network addresses a, b or c (e.g., advertisements) may be computed to give Pr(ad-landing-page |a), Pr(ad-landing-page |b), and Pr(ad-landing-page |c), respectively. By simply comparing these probabilities, a determination can be made regarding which advertisement (a, b, or c) is the most effective.

Efficiently Calculating Statistics:

The calculation of statistics can involve the analysis of large amounts of weblog data. A special algorithm called a "contiguous re-ordering algorithm" can be used to more efficiently organize the records within the network site log, for purpose of computing statistics.

A contiguous re-ordering algorithm can take original site log data, and re-arrange the order of the rows, so that data from the same session are on contiguous rows. A re-ordering of this kind may be accomplished by a strategy of hashing to disk locations. This operation can run in a time that is proportional to the number of records in the database L, which in Computer Science notation is written as O(L).

In situations where the hashing strategy above is undesirable, the data can be sorted by session to accomplish the same contiguous re-ordering. Sorting is less efficient than the hashing method above, and may have a running time that is substantially directly proportional to L*log(L). Either of those algorithms, or perhaps another algorithm, may be used to achieve a contiguous ordering of the data.

After the data is contiguously re-ordered, session statistics for a network site can be more easily computed. An exemplary algorithm for calculating session statistics is given below:

```
LastSession = -1           // last observed sessionID
click = -1                 // the click number
Cooc_overall = ( );
Clickdist_overall = ( );
// Cooc_overall(a,b) stores the number of times that a preceded b
// in different sessions. Clickdist_overall(a,b) stores the sum of
// minimum number of clicks it took for the user to travel between a
// and b during each session
While not eof network_activity_log
  Row = readrow( );
  if (Row.session == LastSession) or (LastSession==-1) then
    // read it into an array in memory for fast traversal
    click++
    Page[click] = Row.page
    // continue reading pages into memory until the session is finished
  else
    // All pages in the session have been read, now update the
  // statistics about the relationships between pages
    Clicks=click;         // remember the number of clicks in this
                                    session
// Initialize intra-session statistics
// Cooc and Clickdist hold statistics about which a,b pairs were observed,
// and the min clicks it took the user to travel from a to b in the
// current session, respectively
    Cooc = ( );           // set to empty
    Clickdist = ( );      // set to empty
    // Find all temporal relationships between a and b in the session
    // The example below computes T(a,b), the number of times that
    // a preceded b in sessions. However, other statistics
    // and tuples may be calculated with slight modifications to this
      procedure
    for click1=0 to clicks
      for click2=0 to clicks
        if (click1<click2)
            // remember that page[click1] preceded page[click2] in
              this session
          Cooc(page[click1],page[click2])=1;
          dist = click2–click1;
          if (dist < Clickdist(page[click1],page[click2])
            // remember the distance between these two pages
            Clickdist[page[click1],page[click2])=dist;
        end
```

```
            end
          end
        end
        // Relationships in this session have just been examined.
        // The global statistics can now be updated
        // The "+" operator below means that for each a,b in Cooc,
        // set Cooc_overall(a,b) ≈ Cooc_overall(a,b) + Cooc(a,b)
        Cooc_overall = Cooc_overall + Cooc
        Clickdist_overall = Clickdist_overall + Clickdist
        // Prepare to read another session into memory to examine
        // relationships between the network addresses in that session
        click=-1;
      End // finished analyzing session, ready for new session
End; // read next record
```

The statistical counting algorithm works as follows. After a new transaction record is read, the session statistics are initialized. The data for the next session is read, and as long as the session is the same as the session for the previous record, a data-structure containing the session is built up in memory. If a new session is detected, the data processing system (e.g., computer 12 or 16) can then efficiently traverse that data-structure in memory, compute all of the relationships between addresses, and then read out those counts to a global count variable.

After completing the session, the data processing system (computer 12 or 16) frees the RAM occupied by the last session's data (the data-structure that was built up in memory, and the intra-session counters) before processing information related to the next session. Thus, a more manageable amount of memory is used.

For practical reasons, a limit may placed on the size of each session being read, so that if a session is loaded with more than the maximum number of events ("Pmax"), then the session can be either truncated or removed entirely. This strategy may be advantageous for at least a couple of reasons. Firstly, many long paths are generated by robots. For example, search engine crawlers may generate thousands of requests. Similarly, some companies deploy robots that test if network addresses are still accessible by repeatedly requesting those addresses several times a minute. Such programs generate clickstreams which obfuscate how intelligent visitors are moving on the site. Identifying these long, machine-generate clickstreams can be done by finding clickstreams with more than Pmax pages. However, eliminating long clickstreams may not just improve the quality of results. Implementing a threshold Pmax may also ensure that the algorithm will run in a time that scales with $Pmax^2$ and memory that is bounded by a function of Pmax. Thus, total running time may be reduced from $O(L^2)$ to $O(L*Pmax^2)$ with RAM bounded by $O(Pmax+Y)$ where Y is the storage needed to record the affinities encountered. This greatly improves the predictability of the algorithm's running time.

Significance Test Criterion:

The significance test criterion is shown in block 322 of FIG. 3. Many choices of significance tests are available, including the chi-square test and the Kullback-Leibler disparity from information theory.

In the embodiment described below, a significance test called "lift" may be used. A separate traffic flow test may be performed in addition to the lift test to determine which addresses have a high enough flow in order for them to be graphable. The lift for two network addresses a and b can defined by the equation below:

$$Lift(a,b) \approx Pr(b|a)/Pr(b)$$

Lift can also be rewritten as:

$$Lift(a,b) \approx Pr(b\&a)/(Pr(a)*Pr(b)).$$

≈Observed/Expected

This latter equation shows that lift divides the observed probability of a and b by expected random rate of occurrence for the two pages, which is Pr(a) times Pr(b). Thus, lift is equal to the number of times higher or lower than expected that the two network site addresses are visited.

The application of a significance test above can be used extensively to eliminate uninteresting links that would otherwise clutter a graph.

Figure 7:
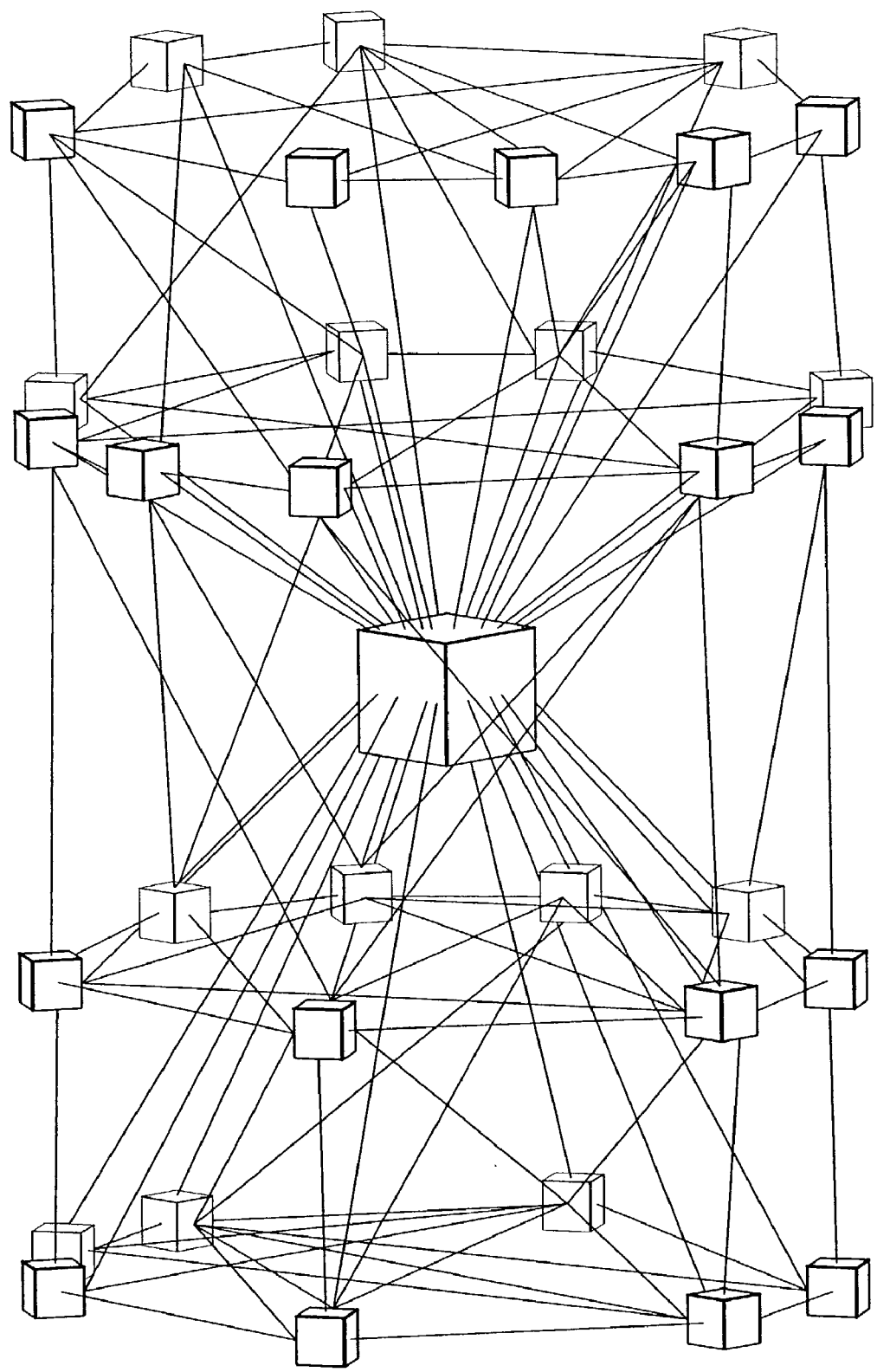
FIG. 7 includes an illustration of nearly all network addresses and paths between the addresses for a network site.
Figure 8:
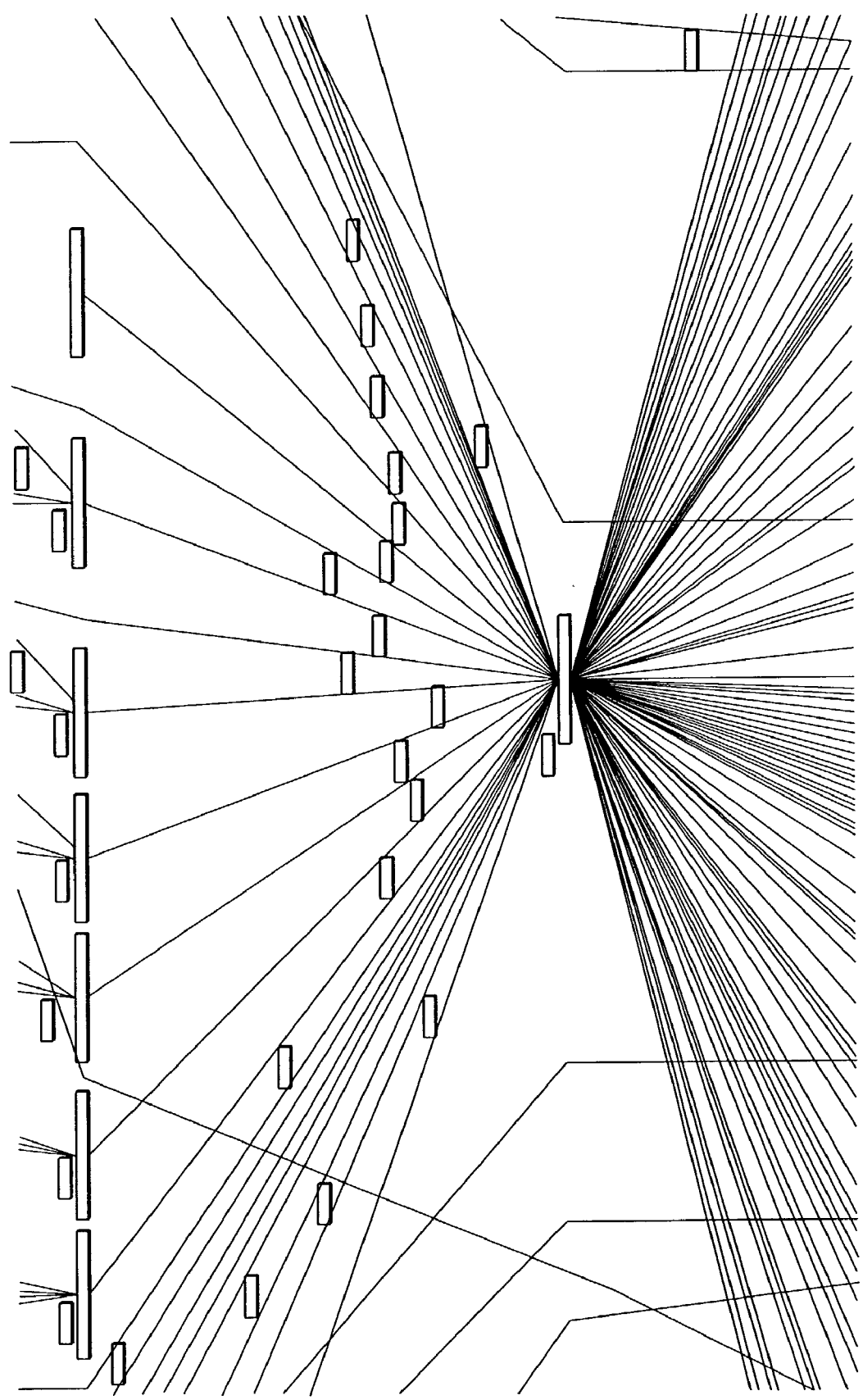
FIG. 8 includes an illustration of an enlarged view of a portion of FIG. 7 near its center.

FIGS. 7 and 8 may represent graphs having all data from a network site log and a portion of that data near a particular location, respectively. The top portion of FIG. 7 illustrates entry points into a network site, and the bottom portion of FIG. 7 illustrates exit points from a network site. The graphs are very difficult to use for detecting any clear patterns. Even with FIG. 8, the network site address presented near the center can be reached from or lead to many other network site addresses. FIG. 8 does not indicate which of the other network site addresses are important with respect to the network site address within the middle of the FIG. 8.

Traffic Flow Criterion:

To improve the "signal-to-noise" ratio for the graph, traffic flow criterion and a significance criterion may be used together to filter the data. For example, the traffic flow criterion may be a minimum threshold on the number of times that a network address is requested, for it to be included in the graph. Alternatively, the traffic flow criterion may be a minimum request rate at which a network address is requested (clicks per time period (e.g., clicks per day, week, month, year, etc.)) or any of the affinities previously described. The significance criterion may be at least three and possibly higher when lift is used to measure significance.

In some embodiments the Traffic Flow criterion may be omitted. In other embodiments, the Traffic Flow criterion may be incorporated into the Significance Test.

For instance, in the statistical chi-squared test, the formula for chi-square includes the number of observations of the variable being tested for significance. If an assumption is made that the variable being tested for significance is "the probability of traveling between two addresses during a session," then the number of observations of that variable would be the number of sessions reaching both addresses. Thus, the number of observations (for purposes of computing chi-square) would be identical to the traffic flow between a and b.

This example shows that a significance test may implicitly incorporate traffic flow. Thus, the Traffic Flow criterion may be (i) separate from the significance test, (ii) incorporated within the significance test, or (iii) omitted completely.

After selecting a traffic flow criterion and a significance criterion, the method includes determining that a first portion of the data from the network site log and the significance results meet the traffic flow criterion and the significance criterion as shown in block 342 of FIG. 3. The traffic flow criterion helps to reduce rarely or infrequently visited network addresses or instances where affinities are low. The significance tests help to highlight network addresses that have a significant relationship to each other.

Graph Generation:

After determining which addresses (nodes) and relationships (edges) are graphable, and the statistics about each, generating the graph is performed. Simply placing the nodes onto a sheet and connecting the edges is likely to result in a graph that is effectively a "mass of black ink" and is unreadable. This is especially true with weblog data, where large network fan-ins and fan-outs for nodes are common. Faced with this problem, "graph drawing algorithms" can be used to optimize the graph and make it readable and presentable to humans.

Graph drawing algorithms have attracted a great deal of interest because of their application in circuit design. An integrated circuit design needs to be laid out on a two-dimensional semiconductor wafer, so that the total number of wire crossings is kept to a minimum. Also, the surface area of the circuit should be kept as low as possible to minimize material use. The same techniques can be applied to make network site graphs easier to read.

A simple graph-drawing method for optimizing node and edge placement can begin with a random placement of nodes, and then to move the positions of each node v so as to minimize the spring-like forces acting upon that node in each dimension. For example, the forces in the x and y dimension of v, $F_x(v)$ and $F_y(v)$ may be defined to be something like:

$$F_x(v) = \sum_{(u,v)\in E} k_{uv}^{(1)}(d(p_u, p_v) - l_{uv}) \frac{x_v - x_u}{d(p_u, p_v)} + \sum_{(u,v)\in V} \frac{k_{uv}^{(2)}}{d(p_u, p_v)^2} \frac{x_v - x_u}{d(p_u, p_v)}$$

$$F_y(v) = \sum_{(u,v)\in E} k_{uv}^{(1)}(d(p_u, p_v) - l_{uv}) \frac{y_v - y_u}{d(p_u, p_v)} + \sum_{(u,v)\in V} \frac{k_{uv}^{(2)}}{d(p_u, p_v)^2} \frac{y_v - y_u}{d(p_u, p_v)}$$

where, $l_{uv}$ is the natural or zero energy length of the spring between u and v;

$k_{uv}^{(1)}$ is the stiffness of the spring (the larger this value, the closer the spring should be to its ideal distance);

$p_v = (x_v, y_v)$ is the position of node v, $k_{uv}^{(2)}$ gives the strength of repulsion between nodes u and v.

$d(p_u, p_v)$ is the distance between the positions of node u and v $(x_v, y_v)$ are the x,y coordinates of node v.

Minimizing the forces acting on this node can be achieved by moving the node's x and y position in the direction of the negative gradient of this force in each dimension. For example:

$$x_v = x_v - a * F_x(v)$$

$$y_v = y_v - a * F_y(v)$$

where "a" is a small constant 1>a>0. Each node v can iteratively be moved a small amount in the manner above to minimize the local force on the node, and by this technique, the overall sum of forces on nodes may decrease, and the aesthetic readability of the graph may improve.

However, other minimization methods may be used (e.g., stochastic methods which attempt to find a global force minimum), and other force equations or methods may be used with the objective of improving readability. Other algorithms that do not use force equations at all, have also been developed, and may be used.

The method can include an act of generating a first graph based on the first portion of data (block 362 of FIG. 3).

The graphs can be in the form of node-and-line graphs, where line segments or arrows are used to connect the nodes. When arrows are used, the arrows may indicate the relationship of interest; for instance, an arrow from a to b may indicate some statistic of the number of times that visitors travel from a to b. The first graph can be presented by displaying the first graph on a monitor or printing the first graph on a printer, depending on the I/O device used with the computer for generating or examining the first graph.

EXAMPLE 1

A first example may use clickstream data (one month, approximately 720 sites and 720 million network site address requests) provided by an advertising company. Using non-temporal affinities, a map of the resulting patterns of navigation across the World Wide Web (or network) can be constructed. Data used in generating FIG. 7 can be restricted to the highest 500 lifts, and network site addresses having more than 100,000 requests per month. As the weak links drop away, a fascinating graph may be produced.

Figure 9:
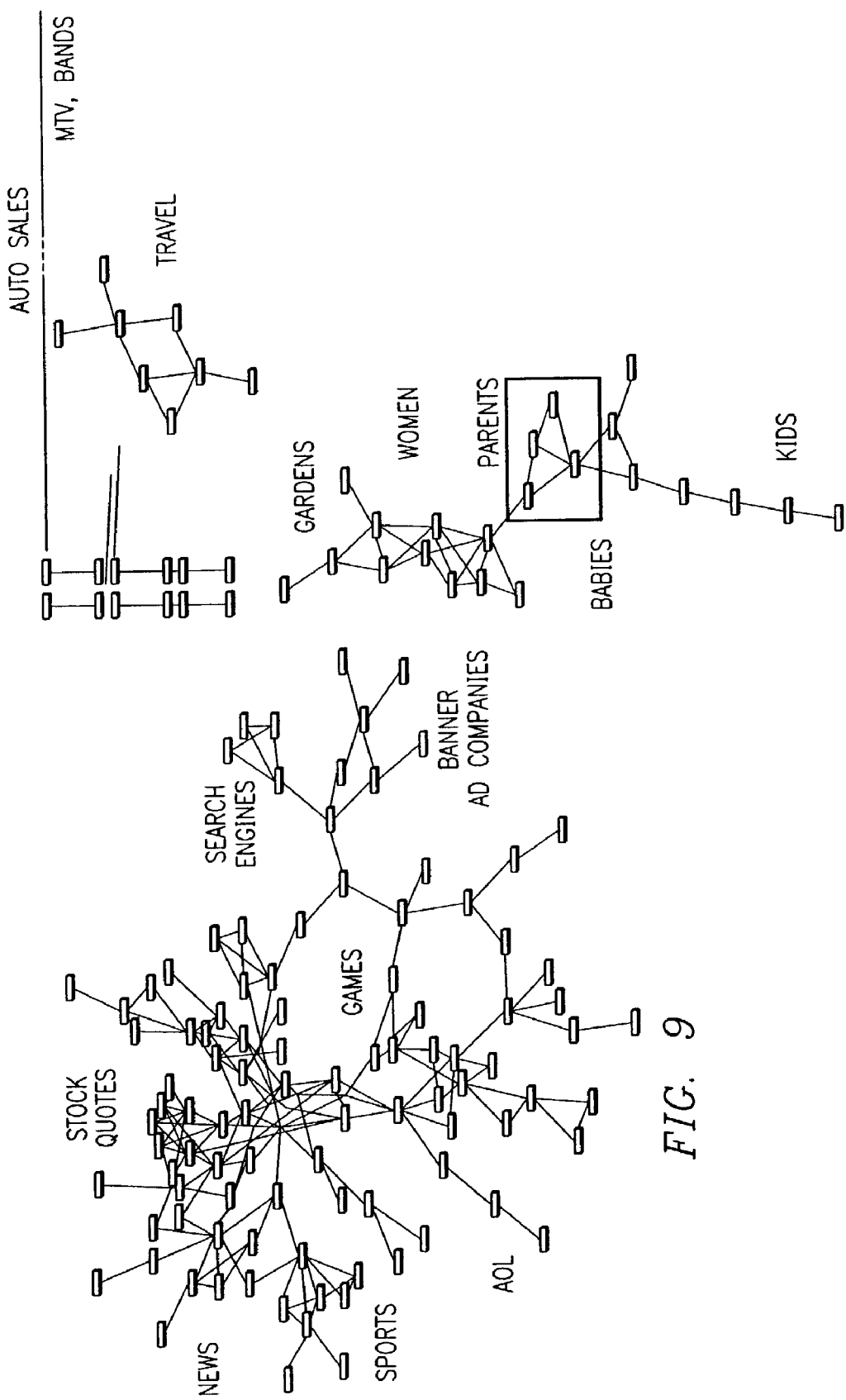
FIG. 9 includes an illustration of a network site map illustrating a view of the network address clusters for network site using the top 500 lift request pairs and at least 100,000 requests per month.

The graph may be partitioned into several regions with similar content as seen in FIG. 9. In the left-hand portion of the graph, a large group of connected network addresses are orientated around News, Sports, AOL, Games, Stock quotes, and Search engines. In the right-hand portion, a variety of isolated groups, including a Travel group, Music, Auto sales, French language, and Parenting/Kids group may be seen.

Figure 10:
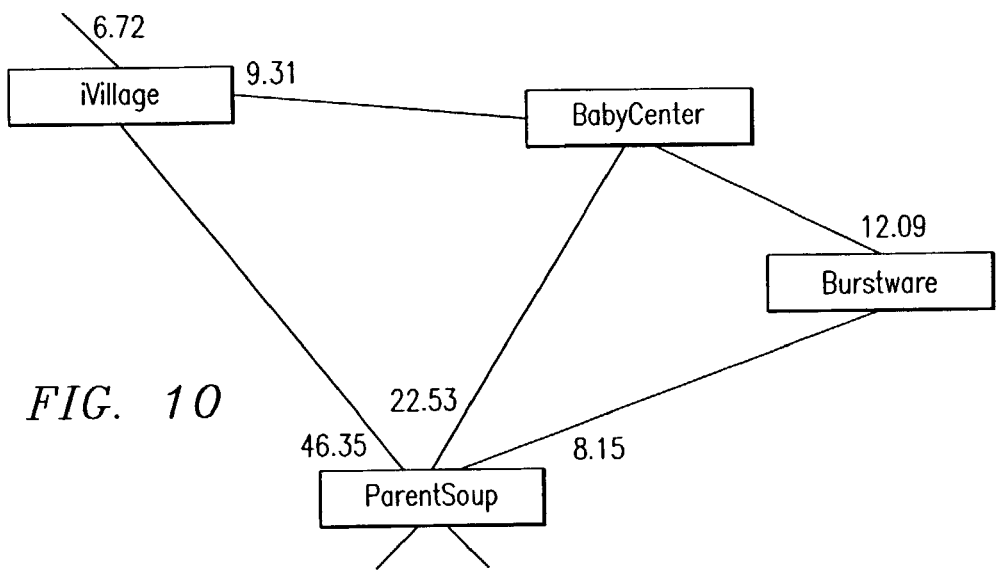
FIG. 10 includes an illustration of an enlarged view of the parents portion of FIG. 9.

FIG. 10 includes an enlarged view of the parenting area. The graph reveals that PBS and Gardening-site visitors tend to frequent Woman and Parenting sites, who are also interested in Kids and Babies. Such a clustering of interests may not have been apparent to content providers in the absence of the graph with the filtered data.

The graph also shows that search engine network addresses show a relatively high rate of defection to competitor search engines. Similarly, travel sites (travelocity, itravel, thetrip, etc.) show high degree of defection to each other.

Re-Generating the Graph:

The method can include reviewing the first graph (block 402 of FIG. 4). The first graph may contain too much information to visually show meaningful information. In response to the reviewing, the method may optionally include an act of changing the traffic flow criterion, the significance criterion, or both (block 422). For example, the traffic flow criterion may be raised from at least 100 requests to at least 300 requests, and the significance criterion may be raised from a lift of 10 to a lift of 20. After the criteria are changed, the method may be used to determine that a second portion of the data from the network site log and significance results meet the changed criteria (block 442). The method may include further acts of generating a second graph based on the second portion of the data (block 462) and presenting the second graph for additional review, if desired.

EXAMPLE 2

Figure 11:
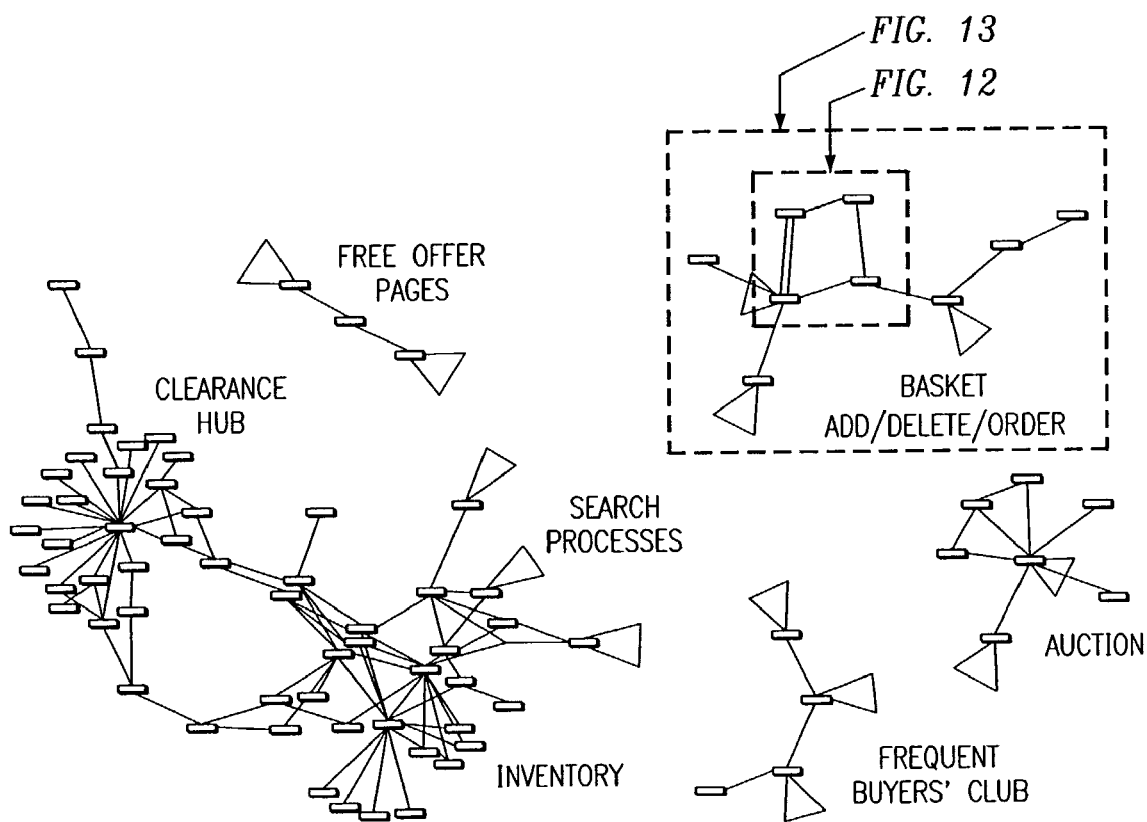
FIG. 11 includes an illustration of a view of clusters and hubs of a network site with lift greater than 5 and sequential affinity of greater than 200.

A second example of a graph is shown in FIG. 11. FIG. 11 shows a network site partitioned into roughly seven regions. These may be labeled Auction, Frequent Buyers' Club, Free offers, Clearance sale network addresses, Inventory addresses, Search addresses, and Basket add/delete/order addresses. The Clearance hub and Searching addresses are closely associated with the Inventory addresses. A star-shaped area is obtained and has the main clearance sale network address at the center, and clearance-sale-category addresses fanning out in a circle around this main network address. Below this is the Inventory hub. Each of these regions may be investigated in more detail.

Within the Search addresses, a triangle indicates a recurrent link, which can occur by activating a "refresh" button on a browser. The next site a user visits after a search is often another search. The names of the products may be misleading or illogically indexed from an average user's point of view if successive searches are routinely performed.

Figure 12:
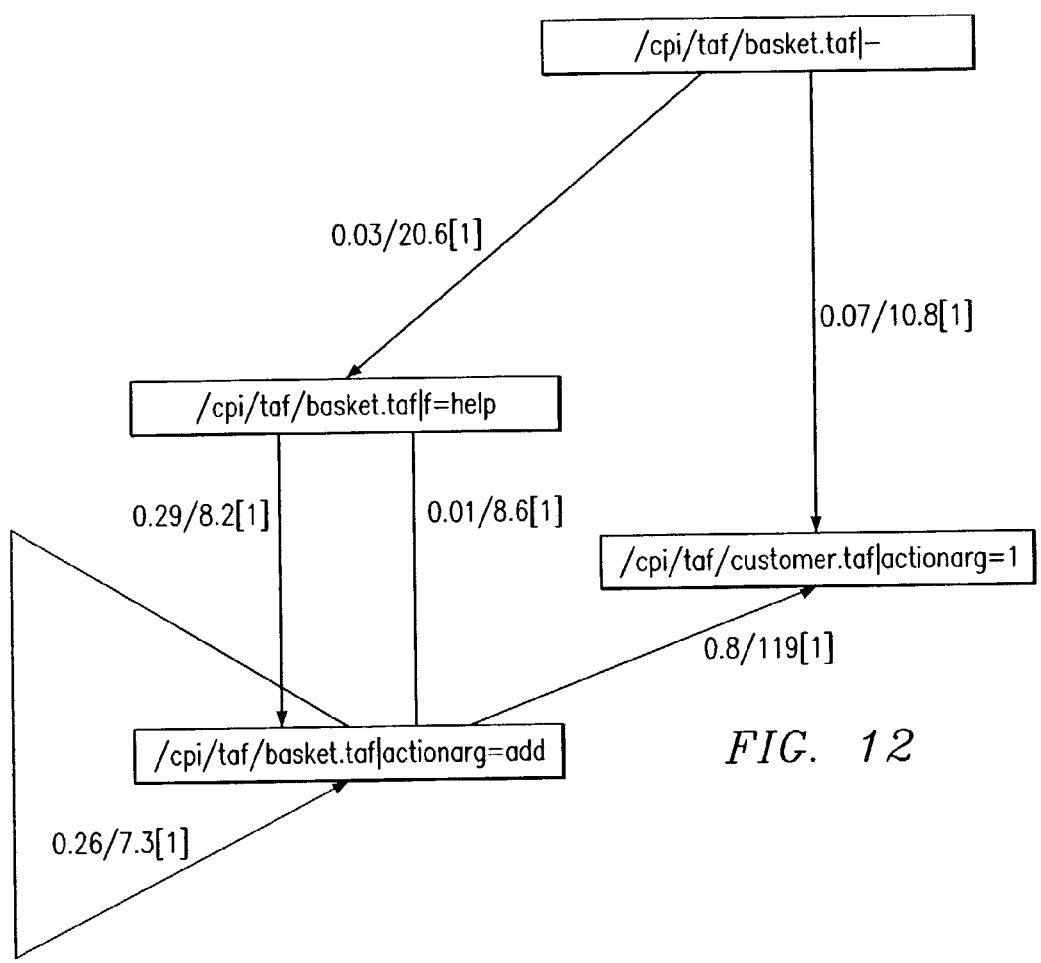
FIG. 12 includes an illustration of enlarged portion of FIG. 11.

FIG. 12 includes an enlarged view of the Basket addresses as shown in FIG. 11. FIG. 12 includes nodes representing different network addresses and arrows between pairs of nodes. Sets of numbers are displayed near the arrows. The format for the set of numbers includes probability (source_network_address|destination_network_address)/lift (source_network_address,destination_network_address) [click distance (source_network_address,destination_network_address). Referring to FIG. 12, there is a 29% probability that a user will go from the "help" address to the "add to basket" address. The lift based on sequential affinity is 8.2. Because a sequential affinity is used, the click distance is one. Fewer or more numbers can be displayed with each set. Also, the different types of numbers (other than probability, lift, and click distance) could be included.

Figure 13:
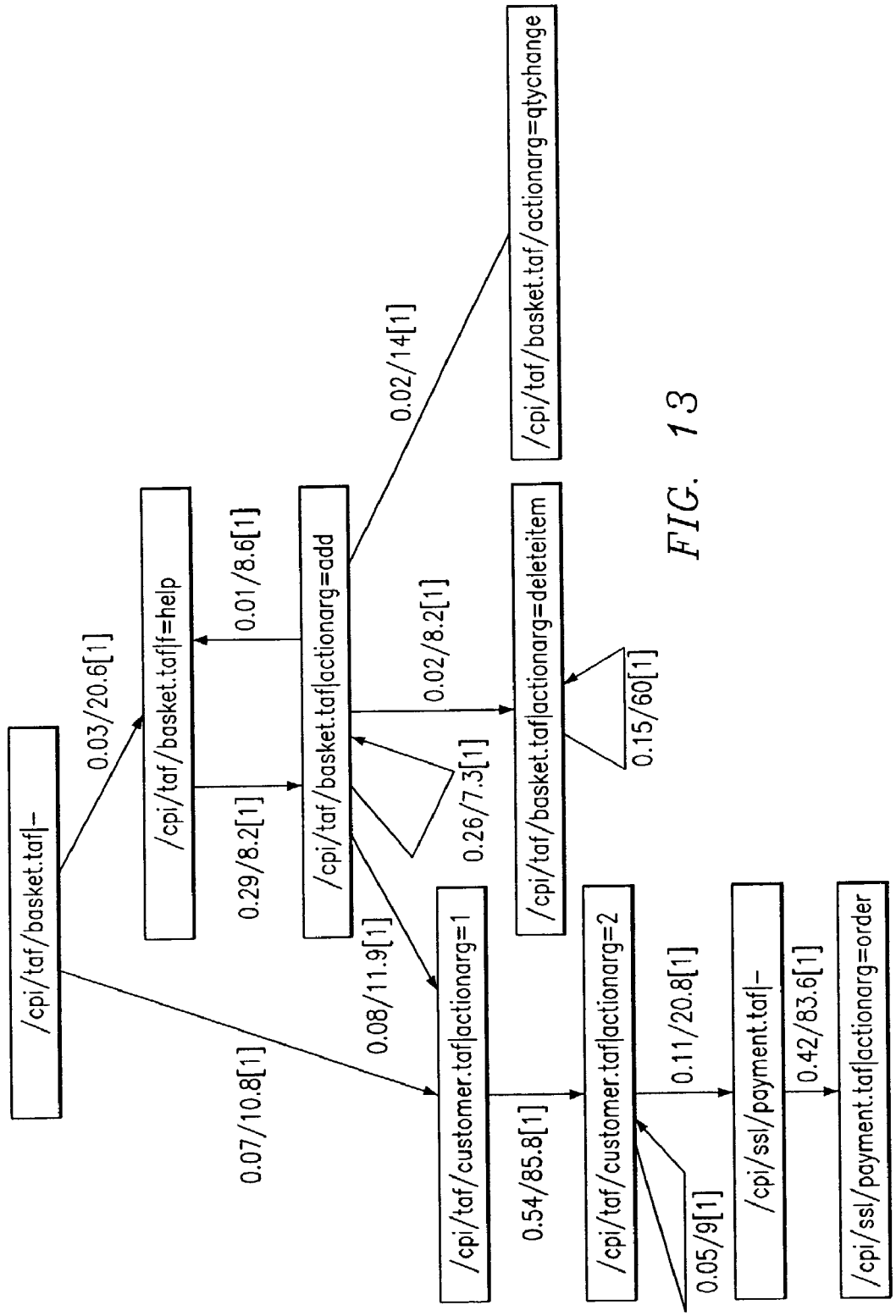
FIG. 13 includes an illustration of the ordering basket portion of FIG. 11 after transformed into a hierarchical layout.

The information in FIG. 11 can be transformed into different layouts. For example, the Basket cluster from FIG. 11 can be converted to a hierarchical layout as shown in FIG. 13. Referring to FIG. 13, after adding to their basket and electing to "checkout," users are taken to a screen where they complete their shipping address called "actionarg=1." There is a 54% chance of the customer completing that information and moving to the "actionarg=2" screen, which asks the user to enter his or her credit card number and confirm the order. However, there is only an 11% chance of clicking "confirm order." Further, 5% of the time, customer's will refresh on the confirm order screen (represented by a recurrent link with a triangular shape having a source and destination at the same network address) perhaps indicating the user is having trouble. Also in FIG. 13, after visiting help, there is a 29% chance of the customer adding something else to his or her basket. From this information, links to ordering network addresses may be displayed when a help network address is requested.

In still another example, temporal affinities may be used. Temporal affinities are used to predict where customers go after viewing a page.

Figure 14:
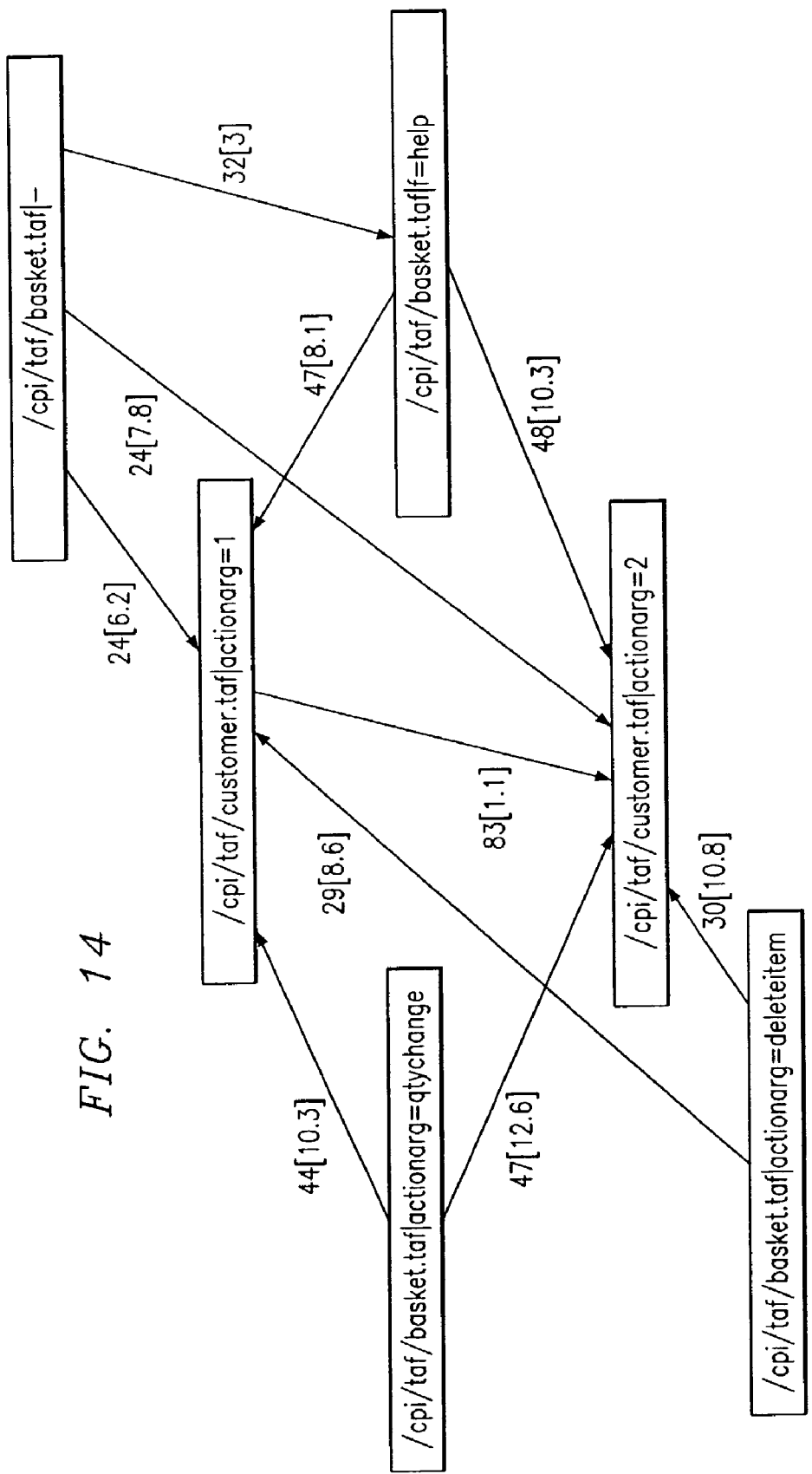
FIGS. 14 and 15 include portions of the ordering basket information from a network site when temporal affinities are used.
Figure 15:
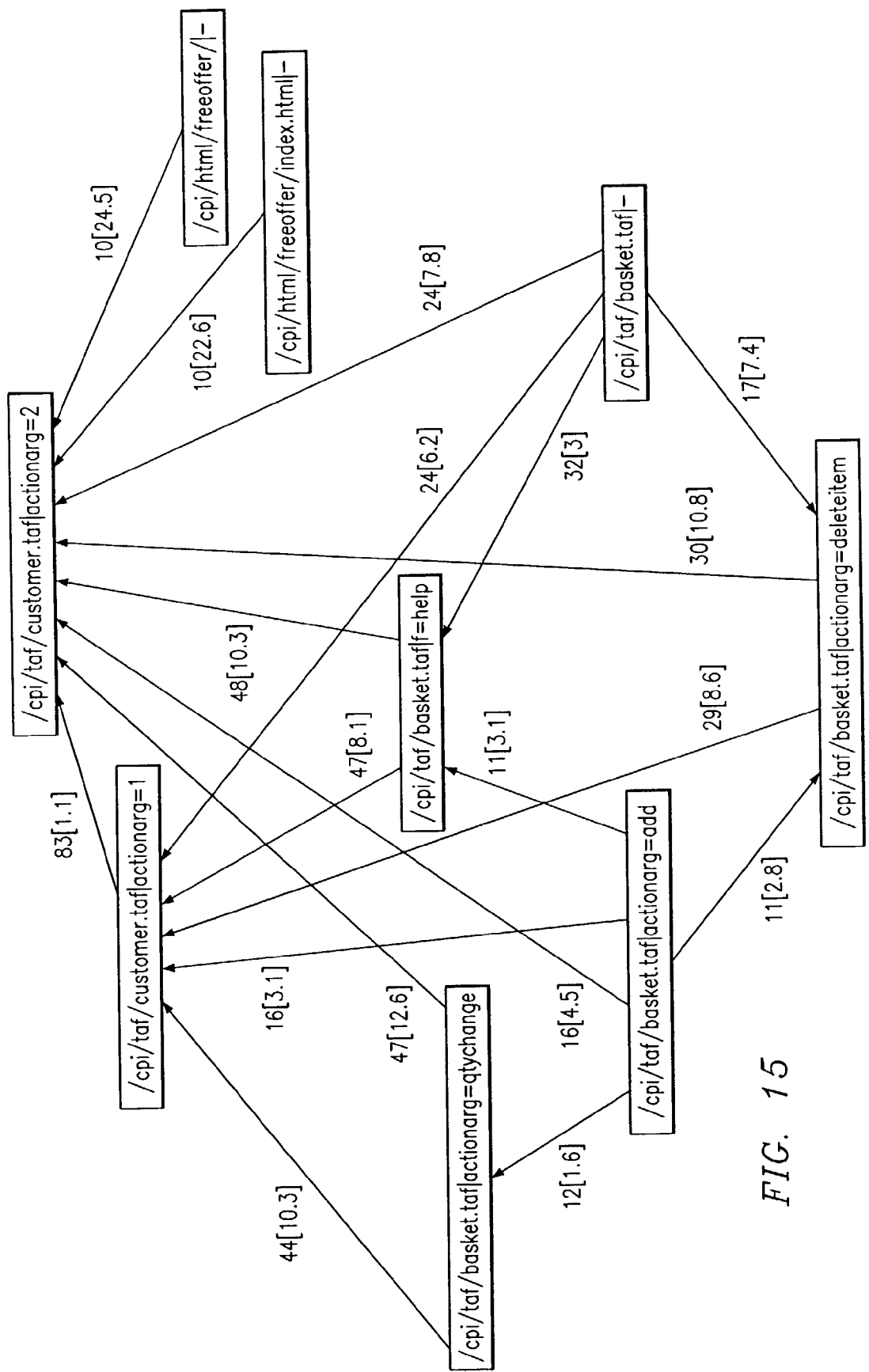

FIG. 14 includes substantially the same data for the ordering process as in FIG. 15 except that Lift(a,b)>20. For FIGS. 14 and 15, temporal affinities (>200) and force-directed layout are used. Data in FIG. 14 indicate that, after visiting help, users may complete basic information (within approximately eight clicks), and complete their orders within approximately 10 clicks. The data also suggests that "help" may be important for order completion. Customers may complete or confirm their order approximately 10 clicks after requesting help. Note the high lift of approximately 48. FIG. 15 uses Lift(a,b)>10. Data in FIG. 15 indicate that free offers are good for causing order completion. Order completion occurs approximately 22.6 clicks on average after requesting a free offer index network address.

The prior examples include only a few ways of using the information that can be gleaned from a network site log. An almost infinite number of graphical representations can be formed by adjusting the threshold for significance and traffic support criteria. The data may be used to generate graphs based order of typical request or be transformed to a hierarchical layout or potentially other layouts.

In other embodiments, the approximations recited above may be replaced by equations. Further, when a sequence of clicks is generated that is recognized by the server computer 16 based on data in database 18, the server computer may dynamically change the links displayed with subsequent network addresses in anticipation of what the user will do based on the user's prior behavior or by the collective behavior of all users or a set of users on the network or at the network site (e.g., users that tend to buy particular types of items).

In a specific, non-limiting embodiment, generating and displaying a graph is not required. Although humans can process visual data better than long lists of tabular data, computers may not need to "visualize" the site in order to make recommendations for static or dynamic links to the network site operator or visitor. Still, significance tests and traffic flow information (whether as part of the significance tests or as a separate criterion) can be used to provide valuable information regarding user behavior.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of visualizing and analyzing user clickstream data for a network comprising:
    performing a significance test on the user clickstream data from a network log and generating significance results, the network log storing activities of a plurality of users;
    determining which of the user clickstream data from the network log meet a traffic flow criterion and which of the significance results meet a significance criterion to form determined data; and
    generating a first graph based on the determined data, wherein the first graph comprises a node-and-line format with line segments between nodes and wherein generating the first graph further comprises:
        placing a first number near a corresponding line segment between a first node and a second node, wherein the first number comprises one of the significance results and represents a significance between a first network address, which corresponds to the first node, and a second network address, which corresponds to the second node; and
        placing a second number near the corresponding line segment, wherein the second number comprises a click distance between the first network address and the second network address.

2. The method of claim 1, wherein performing the significance test comprises:
calculating a probability that a first network address will be requested by a user during a session;
calculating a probability that a second network address will be requested by the user during the session; and
calculating a probability that the first network address and the second network address will be requested by the user during the session.

3. The method of claim 2, wherein performing the significance test comprises:
calculating a product of the probability that the first network address will be requested by the user during the session and the probability that the second network address will be requested by the user during the session; and
calculating a quotient by dividing (i) the probability that the first network address and the second network address will be requested by the user during the session by (ii) the product.

4. The method of claim 1, wherein determining comprises determining whether a network address is requested at least a predetermined threshold number or a predetermined threshold request rate.

5. The method of claim 1, wherein determining comprises determining whether an affinity between two network addresses is at least at a predetermined threshold level.

6. The method of claim 1, wherein:
the line segments are part of arrows between the nodes; and
a direction of each of the arrows indicates a more predominant direction between its corresponding nodes compared to a reverse direction between those nodes.

7. The method of claim 1, further comprising:
changing at least one of the traffic flow and significance criteria to another criterion; and
determining which of the user clickstream data from the network log meet the another criterion.

8. A method of visualizing and analyzing user clickstream data for a network comprising:
performing a significance test on the user clickstream data from a network log and generating significance results, the network log storing activities of a plurality of users;
determining which of the user clickstream data from the network log meet a traffic flow criterion and which of the significance results meet a significance criterion to form determined data; and
generating a first graph based on the determined data, wherein the first graph comprises a node-and-line format with line segments between nodes and wherein generating the first graph further comprises:
placing a first number near a corresponding line segment between a first node and a second node, wherein the first number comprises one of the significance results and represents a significance between a first network address, which corresponds to the first node, and a second network address, which corresponds to the second node; and
placing a second number near the corresponding line segment, wherein the second number comprises a probability that the first network address and the second network address will be requested by a user during a session.

9. The method of claim 8, further comprising:
changing at least one of the traffic flow and significance criteria to another criterion; and
determining which of the user clickstream data from the network log meet the another criterion.

10. The method of claim 8, wherein performing the significance test comprises:
calculating a probability that a first network address will be requested by a user during a session;
calculating a probability that a second network address will be requested by the user during the session; and
calculating a probability that the first network address and the second network address will be requested by the user during the session.

11. The method of claim 10, wherein performing the significance test comprises:
calculating a product of the probability that the first network address will be requested by the user during the session and the probability that the second network address will be requested by the user during the session; and
calculating a quotient by dividing (i) the probability that the first network address and the second network address will be requested by the user during the session by (ii) the product.

12. The method of claim 8, wherein determining comprises determining whether a network address is requested at least a predetermined threshold number or a predetermined threshold request rate.

13. The method of claim 8, wherein determining comprises determining whether an affinity between two network addresses is at least at a predetermined threshold level.

14. The method of claim 8, wherein:
the line segments are part of arrows between the nodes; and
a direction of each of the arrows indicates a more predominant direction between its corresponding nodes compared to a reverse direction between those nodes.

15. A method of visualizing and analyzing user clickstream data for a network comprising:
performing a significance test on the user clickstream data from a network log and generating significance results, wherein the network log stores activities of a plurality of users and wherein traffic flow information is incorporated into the significance test;
determining which of the significance results meet a significance criterion to form significant data; and
generating a first graph based on the significant data, wherein the first graph comprises a node-and-line format and line segments between nodes, wherein generating the first graph further comprises:
placing a first number near a corresponding line segment between a first node and a second node, wherein the first number comprises one of the significance results and represents a significance between a first network address, which corresponds to the first node, and a second network address, which corresponds to the second node; and
placing a second number near the corresponding line segment, wherein the second number comprises a click distance between the first network address and the second network address.

16. The method of claim 15, wherein performing the significance test comprises:
calculating a probability that a first network address will be requested by a user during a session;
calculating a probability that a second network address will be requested by the user during the session; and calculating a probability that the first network address and the second network address will be requested by the user during the session.

17. The method of claim 16, wherein performing the significance test comprises:
calculating a product of the probability that the first network address will be requested by the user during the session and the probability that the second network address will be requested by the user during the session; and
calculating a quotient by dividing (i) the probability that the first network address and the second network address will be requested by the user during the session by (ii) the product.

18. The method of claim 15, wherein determining comprises determining whether a network address is requested at least a predetermined threshold number or a predetermined threshold request rate.

19. The method of claim 15, wherein determining comprises determining whether an affinity between two network addresses is at least at a predetermined threshold level.

20. The method of claim 15, wherein:
the first graph comprises arrows between nodes; and
a direction of each of the arrows indicates a more predominant direction between its corresponding nodes compared to a reverse direction between those nodes.

21. The method of claim 15, further comprising:
changing the significance criterion to a different criterion; and
determining which of the significance results meets the different criterion.

22. A method of visualizing and analyzing user clickstream data for a network comprising:
performing a significance test on the user clickstream data from a network log and generating significance results, wherein the network log stores activities of a plurality of users and wherein traffic flow information is incorporated into the significance test;
determining which of the significance results meet a significance criterion to form significant data; and
generating a first graph based on the significant data, wherein the first graph comprises a node-and-line format and line segments between nodes, wherein generating the first graph further comprises:
placing a first number near a corresponding line segment between a first node and a second node, wherein the first number comprises one of the significance results and represents a significance between a first network address, which corresponds to the first node, and a second network address, which corresponds to the second node; and
placing a second number near the corresponding line segment, wherein the second number comprises a probability that the first network address and the second network address will be requested by a user during a session.

23. The method of claim 22, further comprising:
changing the significance criterion to a different criterion; and
determining which of the significance results meets the different criterion.

24. The method of claim 22, wherein performing the significance test comprises:
calculating a probability that a first network address will be requested by a user during a session;
calculating a probability that a second network address will be requested by the user during the session; and calculating a probability that the first network address and the second network address will be requested by the user during the session.

25. The method of claim 24, wherein performing the significance test comprises:
calculating a product of the probability that the first network address will be requested by the user during the session and the probability that the second network address will be requested by the user during the session; and
calculating a quotient by dividing (i) the probability that the first network address and the second network address will be requested by the user during the session by (ii) the product.

26. The method of claim 22, wherein determining comprises determining whether a network address is requested at least a predetermined threshold number or a predetermined threshold request rate.

27. The method of claim 22, wherein determining comprises determining whether an affinity between two network addresses is at least at a predetermined threshold level.

28. The method of claim 22, wherein:
the first graph comprises arrows between nodes; and
a direction of each of the arrows indicates a more predominant direction between its corresponding nodes compared to a reverse direction between those nodes.

29. A data processing system readable medium having code embodied therein, the code comprising:
an instruction for performing a significance test on user clickstream data from a network log and generating significance results, the network log storing activities of a plurality of users;
an instruction for determining which of the user clickstream data from the network log meet a traffic flow criterion and which of the significance results meet a significance criterion to form determined data; and
an instruction for generating a first graph based on the determined data, wherein the first graph comprises a node-and-line format and line segments between nodes and wherein the instruction for generating the first graph further comprises:
an instruction for placing a first number near a corresponding line segment between a first node and a second node, wherein the first number comprises one of the significance results and represents a significance between a first network address, which corresponds to the first node, and a second network address, which corresponds to the second node; and
an instruction for placing a second number near the corresponding line segment, wherein the second number comprises a click distance between the first network address and the second network address.

30. The data processing system readable medium of claim 29, wherein the instruction for performing the significance test comprises:
an instruction for calculating a probability that a first network address will be requested by a user during a session;
an instruction for calculating a probability that a second network address will be requested by the user during the session; and
an instruction for calculating a probability that the first network address and the second network address will be requested by the user during the session.

31. The data processing system readable medium of claim 30, wherein the instruction for performing the significance test comprises:

an instruction for calculating a product of the probability that the first network address will be requested by the user during the session and the probability that the second network address will be requested by the user during the session; and an instruction for calculating a quotient by dividing (i) the probability that the first network address and the second network address will be requested by the user during the session by (ii) the product.

32. The data processing system readable medium of claim 29, wherein the instruction for determining comprises an instruction for determining whether a network address is requested at least a predetermined threshold number or a predetermined threshold request rate.

33. The data processing system readable medium of claim 29, wherein the instruction for determining comprises determining whether an affinity between two network addresses is at least at a predetermined threshold level.

34. The data processing system readable medium of claim 29, wherein:
the line segments are part of arrows between the nodes; and
a direction of each of the arrows indicates a more predominant direction between its corresponding nodes compared to a reverse direction between those nodes.

35. The data processing system readable medium of claim 29, wherein the code further comprises:
an instruction, in response to receiving a signal from a user, for changing at least one of the traffic flow and significance criteria to another criterion;
an instruction for determining which of the user clickstream data from the network log meet the another criterion; and
an instruction for generating a second graph based on the user clickstream data meeting the another criterion.

36. A data processing system readable medium having code embodied therein, the code comprising:
an instruction for performing a significance test on user clickstream data from a network log and generating significance results, the network log storing activities of a plurality of users;
an instruction for determining which of the user clickstream data from the network log meet a traffic flow criterion and which of the significance results meet a significance criterion to form determined data; and
an instruction for generating a first graph based on the determined data, wherein the first graph comprises a node-and-line format and line segments between nodes and wherein the instruction for generating the first graph further comprises:
an instruction for placing a first number near a corresponding line segment between a first node and a second node, wherein the first number comprises one of the significance results and represents a significance between a first network address, which corresponds to the first node, and a second network address, which corresponds to the second node; and
an instruction for placing a second number near the corresponding line segment, wherein the second number comprises a probability that the first network address and the second network address will be requested by a user during a session.

37. The data processing system readable medium of claim 36, wherein the code further comprises:
an instruction, in response to receiving a signal from a user, for changing at least one of the traffic flow and significance criteria to another criterion;
an instruction for determining which of the user clickstream data from the network log meet the another criterion; and
an instruction for generating a second graph based on the user clickstream data meeting the another criterion.

38. The data processing system readable medium of claim 36, wherein the instruction for performing the significance test comprises:
an instruction for calculating a probability that a first network address will be requested by a user during a session;
an instruction for calculating a probability that a second network address will be requested by the user during the session; and
an instruction for calculating a probability that the first network address and the second network address will be requested by the user during the session.

39. The data processing system readable medium of claim 38, wherein the instruction for performing the significance test comprises:
an instruction for calculating a product of the probability that the first network address will be requested by the user during the session and the probability that the second network address will be requested by the user during the session; and
an instruction for calculating a quotient by dividing (i) the probability that the first network address and the second network address will be requested by the user during the session by (ii) the product.

40. The data processing system readable medium of claim 36, wherein the instruction for determining comprises an instruction for determining whether a network address is requested at least a predetermined threshold number or a predetermined threshold request rate.

41. The data processing system readable medium of claim 36, wherein the instruction for determining comprises determining whether an affinity between two network addresses is at least at a predetermined threshold level.

42. The data processing system readable medium of claim 36, wherein:
the line segments are part of arrows between the nodes; and
a direction of each of the arrows indicates a more predominant direction between its corresponding nodes compared to a reverse direction between those nodes.

43. A data processing system readable medium having code embodied therein, the code comprising:
an instruction for performing a significance test on user clickstream data from a network log and generating significance results, wherein the network log stores activities of a plurality of users and wherein traffic flow information is incorporated in the significance test;
an instruction for determining which of the significance results meet a significance criterion to form significant data; and
an instruction for generating a first graph based on the significant data, wherein the first graph comprises a node-and-line format and line segments between nodes and wherein the instruction for generating the first graph further comprises:
an instruction for placing a first number near a corresponding line segment between a first node and a second node, wherein the first number comprises one of the significance results and represents a significance between a first network address, which corresponds to the first node, and a second network address, which corresponds to the second node; and an instruction for placing a second number near the corresponding line segment or the corresponding arrow, wherein the second number comprises a click distance between the first network address and the second network address.

44. The data processing system readable medium of claim 43, wherein the instruction for performing the significance test comprises:
an instruction for calculating a probability that a first network address will be requested by a user during a session;
an instruction for calculating a probability that a second network address will be requested by the user during the session; and
an instruction for calculating a probability that the first network address and the second network address will be requested by the user during the session.

45. The data processing system readable medium of claim 44, wherein the instruction for performing the significance test comprises:
an instruction for calculating a product of the probability that the first network address will be requested by the user during the session and the probability that the second network address will be requested by the user during the session; and
an instruction for calculating a quotient by dividing (i) the probability that the first network address and the second network address will be requested by the user during the session by (ii) the product.

46. The data processing system readable medium of claim 43, wherein the instruction for determining comprises an instruction for determining whether a network address is requested at least a predetermined threshold number or a predetermined threshold request rate.

47. The data processing system readable medium of claim 43, wherein the instruction for determining comprises an instruction for determining whether an affinity between two network addresses is at least at a predetermined threshold level.

48. The data processing system readable medium of claim 43, wherein:
the first graph comprises arrows between nodes; and
a direction of each of the arrows indicates a more predominant direction between its corresponding nodes compared to a reverse direction between those nodes.

49. The data processing system readable medium of claim 43, wherein the code further comprises:
an instruction, in response to receiving a signal from a user, for changing the significance criterion to a different criterion;
an instruction for determining which of the significance results meets the different criterion; and
an instruction for generating a second graph based on the significance results meeting the different criterion.

50. A data processing system readable medium having code embodied therein, the code comprising:
an instruction for performing a significance test on user clickstream data from a network log and generating significance results, wherein the network log stores activities of a plurality of users and wherein traffic flow information is incorporated in the significance test;
an instruction for determining which of the significance results meet a significance criterion to form significant data; and
an instruction for generating a first graph based on the significant data, wherein the first graph comprises a node-and-line format and line segments between nodes and wherein the instruction for generating the first graph further comprises:
an instruction for placing a first number near a corresponding line segment between a first node and a second node, wherein the first number comprises one of the significance results and represents a significance between a first network address, which corresponds to the first node, and a second network address, which corresponds to the second node; and
an instruction for placing a second number near the corresponding line segment or the corresponding arrow, wherein the second number comprises a probability that the first network address and the second network address will be requested by a user during a session.

51. The data processing system readable medium of claim 50, wherein the code further comprises:
an instruction, in response to receiving a signal from a user, for changing the significance criterion to a different criterion;
an instruction for determining which of the significance results meets the different criterion; and
an instruction for generating a second graph based on the significance results meeting the different criterion.

52. The data processing system readable medium of claim 50, wherein the instruction for performing the significance test comprises:
an instruction for calculating a probability that a first network address will be requested by a user during a session;
an instruction for calculating a probability that a second network address will be requested by the user during the session; and
an instruction for calculating a probability that the first network address and the second network address will be requested by the user during the session.

53. The data processing system readable medium of claim 52, wherein the instruction for performing the significance test comprises:
an instruction for calculating a product of the probability that the first network address will be requested by the user during the session and the probability that the second network address will be requested by the user during the session; and
an instruction for calculating a quotient by dividing (i) the probability that the first network address and the second network address will be requested by the user during the session by (ii) the product.

54. The data processing system readable medium of claim 50, wherein the instruction for determining comprises an instruction for determining whether a network address is requested at least a predetermined threshold number or a predetermined threshold request rate.

55. The data processing system readable medium of claim 50, wherein the instruction for determining comprises an instruction for determining whether an affinity between two network addresses is at least at a predetermined threshold level.

56. The data processing system readable, medium of claim 50, wherein:
the first graph comprises arrows between nodes; and
a direction of each of the arrows indicates a more predominant direction between its corresponding nodes compared to a reverse direction between those nodes.

* * * * *